(12) United States Patent
Steffen et al.

(10) Patent No.: US 11,434,757 B2
(45) Date of Patent: Sep. 6, 2022

(54) DIRECT HYDROCARBON INDICATORS ANALYSIS INFORMED BY MACHINE LEARNING PROCESSES

(71) Applicant: ExxonMobil Upstream Research Company, Spring, TX (US)

(72) Inventors: Kurt J. Steffen, Spring, TX (US); Cody J. MacDonald, Houston, TX (US); Jie Zhang, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 392 days.

(21) Appl. No.: 16/776,319

(22) Filed: Jan. 29, 2020

(65) Prior Publication Data
US 2020/0308961 A1 Oct. 1, 2020

Related U.S. Application Data

(60) Provisional application No. 62/823,970, filed on Mar. 26, 2019, provisional application No. 62/823,963, filed on Mar. 26, 2019.

(51) Int. Cl.
*E21B 49/08* (2006.01)
*G01V 1/30* (2006.01)
(Continued)

(52) U.S. Cl.
CPC ............ *E21B 49/087* (2013.01); *E21B 43/16* (2013.01); *E21B 49/00* (2013.01); *G01V 1/30* (2013.01); *G01V 1/306* (2013.01); *G01V 99/005* (2013.01); *G06F 16/9035* (2019.01); *G06F 16/9038* (2019.01); *G06K 9/6263* (2013.01); *G06N 20/00* (2019.01)

(58) Field of Classification Search
CPC ........ E21B 49/087; E21B 43/16; E21B 49/00; G01V 1/30; G01V 1/306; G01V 99/005; G06N 20/00
See application file for complete search history.

(56) References Cited

U.S. PATENT DOCUMENTS 6,587,791 B2 7/2003 Dablain et al.
6,735,526 B1 5/2004 Meldahl et al.
(Continued)

FOREIGN PATENT DOCUMENTS

WO WO2017-132294 A1 8/2017

*Primary Examiner* — Mischita L Henson
(74) *Attorney, Agent, or Firm* — ExxonMobil Upstream Research Company—Law Department

(57) ABSTRACT

Various embodiments described herein provide methods of hydrocarbon management and associated systems and/or computer readable media including executable instructions. Such methods (and by extension their associated systems and/or computer readable media for implementing such methods) may include obtaining geophysical data (e.g., seismic or other geophysical data) from a prospective subsurface formation (that is, a potential formation or other subsurface region of interest for any of various reasons, but in particular due to potential for production of hydrocarbons) and using a trained machine learning (ML) system for direct hydrocarbon indicators (DHI) analysis of the obtained geophysical data. Hydrocarbon management decisions may be guided by the DHI analysis.

16 Claims, 9 Drawing Sheets

(51) Int. Cl.
*G06N 20/00* (2019.01)
*E21B 49/00* (2006.01)
*G01V 99/00* (2009.01)
*G06F 16/9038* (2019.01)
*G06F 16/9035* (2019.01)
*E21B 43/16* (2006.01)
*G06K 9/62* (2022.01)

(56) References Cited

U.S. PATENT DOCUMENTS

| | | |
|---|---|---|
| 6,789,018 B1 | 9/2004 | Khan |
| 6,957,146 B1 | 10/2005 | Taner et al. |
| 7,072,767 B2 | 7/2006 | Routh et al. |
| 7,343,245 B2 | 3/2008 | Young et al. |
| 7,463,552 B1 | 12/2008 | Padgett |
| 7,590,491 B2 | 9/2009 | Saenger |
| 8,838,391 B2 | 9/2014 | Posamentier et al. |
| 8,838,428 B2 * | 9/2014 | Tapscott ............... G01V 99/00 702/18 |
| 8,972,195 B2 | 3/2015 | Posamentier et al. |
| 9,121,968 B2 | 9/2015 | Posamentier et al. |
| 9,817,142 B2 | 11/2017 | Bornhurst et al. |
| 9,988,900 B2 | 6/2018 | Kampfer et al. |
| 10,901,105 B2 * | 1/2021 | Halsey ................... E21B 41/00 |
| 11,208,886 B2 * | 12/2021 | Steffen .................. G01V 1/306 |
| 2014/0303896 A1 * | 10/2014 | Wrobel .................. G01V 1/306 702/14 |
| 2014/0365409 A1 * | 12/2014 | Burch ................ E21B 41/0092 706/12 |
| 2016/0018550 A1 | 1/2016 | Martinelli et al. |
| 2016/0245941 A1 | 8/2016 | Rohnholt et al. |
| 2017/0371054 A1 | 12/2017 | Oukili et al. |
| 2018/0106917 A1 | 4/2018 | Osypov et al. |

\* cited by examiner

DIRECT HYDROCARBON INDICATORS ANALYSIS INFORMED BY MACHINE LEARNING PROCESSES

CROSS-REFERENCE TO RELATED APPLICATION

This application claims the benefit of U.S. Provisional Application 62/823,963, filed Mar. 26, 2019, entitled "Direct Hydrocarbon Indicators Analysis Informed By Machine Learning Processes", and U.S. Provisional Application 62/823,970, filed Mar. 26, 2019, entitled "Direct Hydrocarbon Indicators Analysis Informed By Machine Learning Processes", the entirety of which are incorporated by reference herein.

FIELD

This disclosure relates generally to the field of geophysical prospecting and, more particularly, to prospecting for hydrocarbons and related data processing. Specifically, exemplary embodiments relate to methods and apparatus for detecting hydrocarbons using direct hydrocarbon indicators in geophysical data (such as seismic data) and/or quantifying chance of validity therein by using machine learning processes (such as supervised machine learning).

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of hydrocarbon prospecting is to accurately detect, locate, identify, model, and/or quantify subsurface structures and likelihood of hydrocarbon occurrence. For example, seismic data may be gathered and processed to generate subsurface models. Seismic prospecting is facilitated by acquiring raw seismic data during performance of a seismic survey. During a seismic survey, one or more seismic sources generate seismic energy (e.g., a controlled explosion, or "shot") which is propagated into the earth. Seismic waves are reflected from subsurface structures and are received by a number of seismic sensors or "receivers" (e.g., geophones). The seismic data received by the seismic sensors is processed in an effort to create an accurate mapping (e.g., an image) of the subsurface region. The processed data is then examined (e.g., analysis of images from the mapping) with a goal of identifying geological structures that may contain hydrocarbons.

One tool of hydrocarbon prospecting is Direct Hydrocarbon Indicators (DHI) analysis. Generally, DHI analysis is used to quantify the hydrocarbon-bearing possibility of a geophysical anomaly of a prospective subsurface formation. For example, prospective subsurface formations with similar seismic signatures may contain a great deal of brine or hydrocarbons. DHI analysis seeks to identify prospective subsurface formations more likely to contain primarily hydrocarbons. DHI analysis has been used in the oil industry for several decades. For an explanation of some known DHI analysis practices, see Paragraphs [0003]-[0005] and [0046]-[0052] of U.S. Patent Application Publication No. 2014/0303896 A1, the disclosure of which is incorporated herein by reference. In applying DHI analysis, some practitioners have developed a multi-attribute rating system to detect and/or characterize a geophysical anomaly (simply called an anomaly), based on a combination of interpreted geophysical attributes of the subsurface (indicated by seismic or other geophysical data). Such attributes tend to be good predictors of hydrocarbon accumulation when observed to be present. DHI analysis aims to improve de-risking capability. For example, experts may utilize the multi-attribute rating system to evaluate the probability that a geophysical anomaly represents hydrocarbon accumulation. Typically, the expert may use his/her judgment to translate the subsurface geophysical data (and/or data or information derived therefrom or otherwise obtained and which is useful in deducing features of the subsurface) into a combined Chance of Validity (COV), stated as a fraction or percentage and associated with either a particular one or more DHI, and/or generally with the subsurface region from which the analyzed data is obtained (e.g., based on the DHI inferred from the data, and/or associated with one or more anomalies believed to be indicated by the data based upon assessment of DHI in the data). The COV may assist in making upstream decisions, such as in hydrocarbon management, and/or reducing the associated economic risks and improving exploration performance in such upstream decisions. Exemplary decisions include: which properties to lease for exploration and how much to bid on these properties in auction; where to drill when exploring for new hydrocarbon resources; what will be the extractable volume, flow rate, and depletion mechanism of discovered resources; where will injector and producer wells be drilled; and what size facility with what capabilities must be built at the surface to process the produced fluids. In the event that a subsurface model has higher uncertainty than desired, final decisions may be postponed to allow for collection of additional, targeted data. Alternatively, a final decision may be hedged (e.g., economic hedging) to allow for business success under multiple subsurface scenarios. However, these alternatives may be better evaluated when the COV of a DHI and/or a prospective formation has been quantified.

Current methods of DHI analysis, including characterizing, rating, and scoring DHI attributes and/or quantifying COV, rely to a certain or large extent on subjective judgment of expert human interpreters, informed by past experience. Unfortunately, current multi-attribute rating systems assume/work best if expert human interpreters have and maintain current knowledge of most or all previously-drilled prospects in which the outcome is known and perform consistent assessments for various analyses. Even if past DHI-related prospect information is accumulated in a DHI Rating Database (DHI RDB), use of such a DHI RDB relies on extensive information recall from the expert, which can be inaccurate, inconsistent, taxing to the expert, and problematic in practice. For example, the selective-memory of an expert may only consider DHI individually or in limited combinations, rather than consideration of DHI in various, complex combinations, with continual integration of the consequences of one detected indicator on the presence or lack of other indicators. This becomes particularly true with larger databases: while the larger databases may yield significantly better DHI-related insights due to the larger pool of past ratings to draw from, it becomes correspondingly more difficult for experts to recall all relevant information from such larger databases.

It would be beneficial to use automated systems and methods that consistently and accurately apply past information about previously-drilled prospects in DHI analysis and readily learn or integrate new information to the process automatically.

SUMMARY

Various embodiments described herein provide methods of hydrocarbon management and associated systems and/or computer readable media including executable instructions. Such methods (and by extension their associated systems and/or computer readable media for implementing such methods) may include obtaining geophysical data (e.g., seismic or other geophysical data) from a prospective subsurface formation (that is, a potential formation or other subsurface region of interest for any of various reasons, but in particular due to potential for production of hydrocarbons) and using a trained machine learning (ML) system for direct hydrocarbon indicators (DHI) analysis of the obtained geophysical data. Hydrocarbon management decisions may be guided by the DHI analysis.

For instance, according to some embodiments, a trained ML system may be used to quantify a chance of validity (COV) based at least in part upon prepared geophysical data (e.g., data that has been conditioned or otherwise prepared for use with the trained ML system). In particular embodiments, preparing geophysical data may include identifying DHI of the obtained geophysical data, and further by assigning DHI attribute rating(s) to such DHI. Any of a number of hydrocarbon management decisions (including, e.g., locating a well or causing a well to be located in a particular area to prospect for hydrocarbons) may be made based at least in part upon the quantified COV.

As another example, a trained ML system may be used to identify DHI of the obtained geophysical data, and/or to assign DHI attribute ratings to DHI of the obtained geophysical data. It will be appreciated that in various embodiments, such a trained ML system may be employed to identify and/or rate DHI as part of the aforementioned data preparation in connection with using a trained ML system (either the same or a different trained ML system) for quantifying COV.

Various embodiments described herein also relate to training a ML system. Such training may relate to and include generating a predictive model in the ML system that, given input geophysical data or derivatives thereof, predicts the DHI and/or DHI attribute ratings associated with that input geophysical data. Also or instead, training may relate to and include generating a predictive model in a ML system that, given input prepared data (e.g., data with labeled and/or rated DHI attributes), quantifies COV based upon the prepared data.

In yet further embodiments, a comprehensive ML system (or combination of at least first and second ML systems) may be used to take input geophysical data; identify and/or rate DHI attributes of such data; and, based on identified and/or rated DHI, quantify a COV associated with a prospective subsurface formation corresponding to such input geophysical data (e.g., the prospective subsurface formation from which such geophysical data was obtained).

Various embodiments herein may optionally and advantageously utilize a DHI database as a source for initial geophysical data used in training the ML systems. Such a database may include DHI and/or DHI ratings associated with COV quantifications, and all the foregoing further associated with an outcome indicator (e.g., an indicator of success or failure of hydrocarbon prospecting in a given formation with noted DHI and/or DHI ratings and associated COV quantification).

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
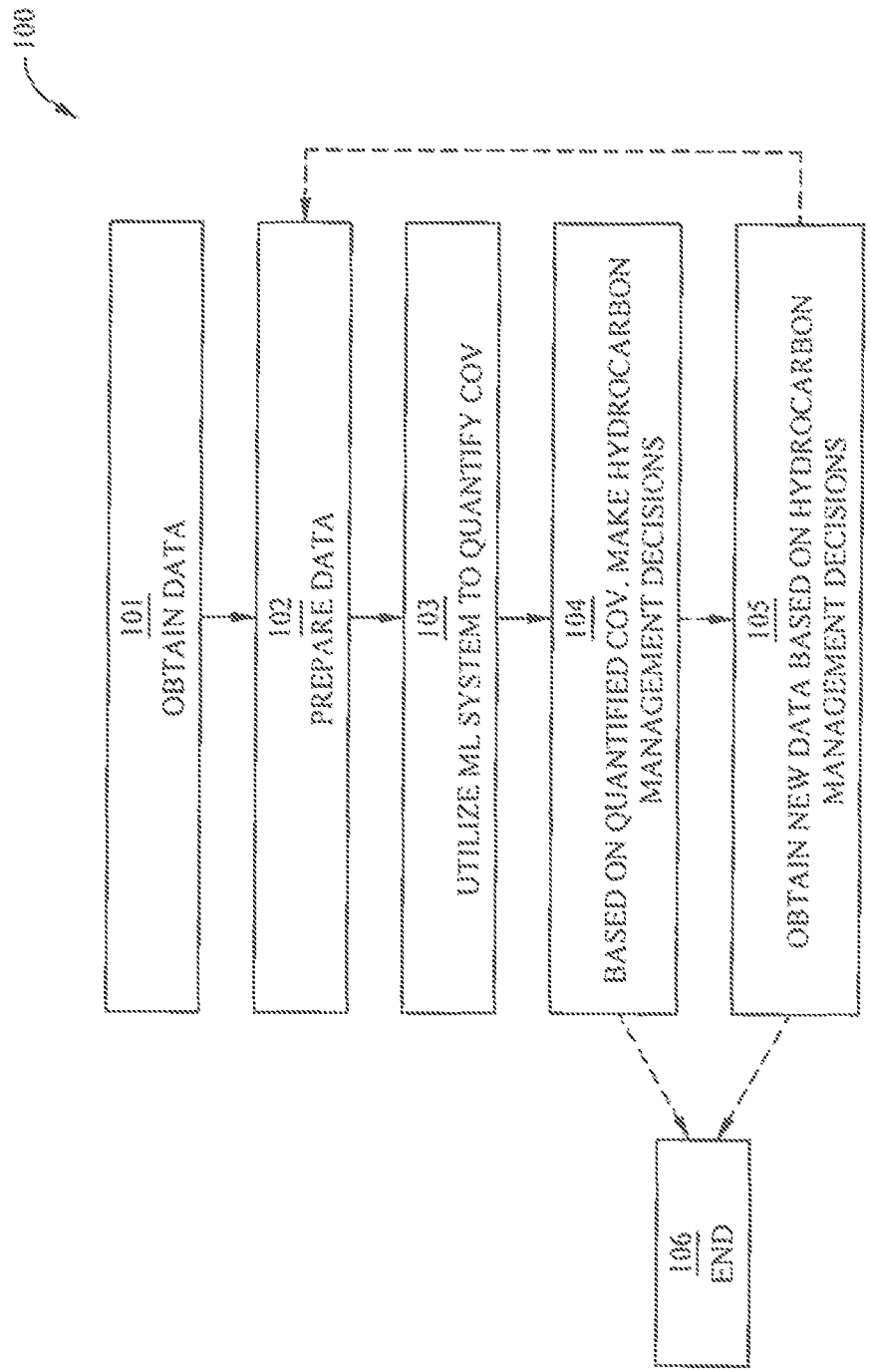
FIG. 1 illustrates an exemplary workflow that utilizes a machine learning (ML) system to quantify Chance of Validity (COV) of an anomaly and/or associated Direct Hydrocarbon Indicators (DHI).

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects.

The term "seismic data" as used herein broadly means any data received and/or recorded as part of the seismic surveying process, including compressional and shear reflection, refraction, and/or converted wave data; but "seismic data" also is intended to include any data or properties, including geophysical properties such as one or more of: elastic properties (e.g., P and/or S wave velocity, P-Impedance, S-Impedance, density, and the like); seismic stacks (e.g., seismic angle stacks); compressional velocity models; or the like, that the ordinarily skilled artisan at the time of this disclosure will recognize may be inferred or otherwise derived from such data received and/or recorded as part of the seismic surveying process. Thus, the present disclosure may at times refer to "seismic data and/or data derived therefrom," or equivalently simply to "seismic data." Both terms are intended to include both measured/recorded seismic data and such derived data, unless the context clearly indicates that only one or the other is intended.

The term "geophysical data" as used herein broadly means seismic data, as well as other data obtained from non-seismic geophysical methods such as potential field and/or electrical resistivity.

The term "physical property model" or other similar models discussed herein refer to an array of numbers, typically a 3-D array, where each number, which may be called a model parameter, is a value of velocity, density, or another physical property in a cell, where a subsurface region has been conceptually divided into discrete cells for computational purposes. For example, a geologic model may be represented in volume elements (voxels).

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.).

As used herein, "obtaining" data or models generally refers to any method or combination of methods of acquiring, collecting, or accessing data or models, including, for example, directly measuring or sensing a physical property, receiving transmitted data, selecting data from a group of physical sensors, identifying data in a data record, generating models from assemblages of data, generating data or models from computer simulations, retrieving data or models from one or more libraries, and any combination thereof.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is enhanced automation of procedures for Direct Hydrocarbon Indicators (DHI) analysis. Such automation may accelerate the outcome of the analysis, reduce subjective bias or error, and/or reduce the geoscience workforce's exposure to ergonomic health risks (e.g., repetitive motion injury). Another potential advantage includes utilizing a machine learning (ML) system to mine a DHI database (e.g., a DHI Rating Database (DHI RDB)) to explore the impact of selected analogues on Chance of Validity (COV) of the anomaly being evaluated. Another potential advantage includes utilizing the ML system to infer DHI of a new set of data based upon insights and training of the system based on the database; the inferred DHI can be used (by the system or by a user) to quantify the COV from the DHI analysis. Another potential advantage includes utilizing the ML system to predict a COV directly (e.g., the ML system may directly infer a COV of the new set of data based upon insights and training of the system based on the database). For example, use of the ML system may transform typically subjective processes performed by humans (DHI rating and/or COV quantification) into a mathematically automated process executed on computers, utilizing different mechanisms for learning and comparisons than are employed by humans attempting the same analysis.

As would be understood by one of ordinary skill in the art with the benefit of this disclosure, a DHI is a characteristic of seismic or other geophysical data that tends to indicate the presence of potentially hydrocarbon-bearing formations in a subsurface region from which the geophysical data was obtained. A DHI may be a type or feature of a signal, a type of anomaly (corresponding to a geophysical feature in the subsurface) indicated by the data, or any of various indicia indicated by or otherwise arising from the data (e.g., in the case of seismic data, types of seismic signatures, seismic amplitude anomalies, seismic events etc.). These are also sometimes referred to as "DHI attributes" of the data, insofar as they represent identified attributes of data that tend to indicate the presence of hydrocarbons in the subsurface region of interest (i.e., the prospective subsurface formation from which the geophysical data is obtained).

It should be noted, however, that similar characteristics (attributes) of seismic or other geophysical data may also be the result of non-hydrocarbon-bearing geologic formations. Therefore, as further discussed below, DHI analysis includes both (i) detection (identification) of potential DHI attributes in seismic or other geophysical data, and (ii) rating the likelihood that the detected/identified attribute is, in fact, a valid indicator of hydrocarbon. As part of such rating, the quality of data being analyzed may also be quantified.

A variety of DHI attributes may be indicated by (or equivalently, inferred from) seismic and other geophysical data including, but not limited to: (1) amplitude strength (amplitude relative to background), (2) amplitude variation with offset (AVO) or amplitude variation with angle (AVA), (3) fluid contact reflections or amplitude flat spots, (4) amplitude fit-to-structure, (5) lateral amplitude contrast (amplitude relative to that of laterally equivalent stratigraphy), and (6) down-dip terminations in amplitude and/or other attributes. For instance, other hydrocarbon indicators may include derivative AVO attributes (such as amplitude intercept and gradient), gas chimneys, velocity sags, frequency attenuation, and anomalies obtained from other non-seismic geophysical methods such as electrical resistivity anomalies. More generally, such DHI characteristics or attributes indicated or inferred from seismic and other geophysical data may be referred to as DHI of the geophysical data, DHI attributes of the geophysical data, or the like.

Generally, DHI attributes arise in seismic or other geophysical data from the contrast in properties between different portions of a subsurface region. For example, a DHI attribute may indicate an interface between a hydrocarbon-saturated portion of a formation and a water-saturated portion of the formation. As another example, a DHI attribute may indicate the interface between a hydrocarbon-saturated formation and the encasing cap rock. While the acoustic impedance (product of density and speed of compressional wave sound energy through the media) of hydrocarbon is generally lower than that of brine, the size of the contrast can vary. In addition, other factors (e.g., consolidation state of reservoir material) may result in significant contrasts between a hydrocarbon-saturated reservoir and encasing cap rock, generating unpredictability in the DHI analysis.

Quantifying COV Using a Machine Learning System

FIG. 1 illustrates an exemplary workflow 100 that utilizes a ML system (in some embodiments this may be, for instance, a supervised machine learning, or SML, system) to quantify COV. COV may be quantified based upon a combined review/analysis of some/all DHI and ratings indicated by a given dataset (and accordingly such COV may be considered associated with the prospective subsurface formation and/or other subsurface region being analyzed, and from which the geophysical data is obtained). Such COV quantification may furthermore take into account confidence or other factors informed by an assessment of the quality of data being analyzed. Also or instead, COV may be quantified based upon a particular anomaly indicated by the data to be present (e.g., an anomaly inferred from DHI identification and rating). In yet further embodiments, a quantified COV may also or instead be associated with each identified and rated DHI. In general, then, it can be said that a COV quantification is associated with at least one of the identified DHI from a given set of geophysical data (and, going further, it may be associated with a subset of multiple identified/rated DHI, and/or with all of them collectively).

Returning to FIG. 1, workflow 100 begins at block 101 where initial data (e.g., seismic or other geophysical data) for a subsurface region is obtained. In some embodiments, a seismic survey may be conducted to acquire the initial data (noting that these and other embodiments may also or instead include obtaining other geophysical data in addition to, or instead of, seismic data, such as obtaining electrical resistivity measurements). In these and other embodiments, models may be utilized to generate synthetic initial data (e.g., computer simulation). In some embodiments, the initial data may be obtained from a library of data from previous seismic surveys (e.g., a library of previously analyzed subsurface formations) or previous computer simulations (e.g., the just-referenced synthetic initial data). In some embodiments, a combination of any two or more of these methods may be utilized to generate the initial data.

Workflow 100 continues at block 102 where the data is prepared. Preparing the data may include characterizing the seismic or other geophysical data. Such characterization may include identifying one or more anomalies or any other characteristics from the data indicative of one or more DHI attributes. Such characterization further may include rating the one or more DHI attributes relevant to determining the quality and/or confidence that such DHI attributes do, indeed, indicate the presence of hydrocarbons or a hydrocarbon-bearing formation. Such characterization may provide some quantification of how much confidence to have in whether anomalies or other characteristics of the data (e.g., by seismic or other geophysical interpretation) are, in fact, accurate representations of likely hydrocarbon presence in the prospective subsurface formation of interest (that is, the subsurface region from which the seismic or other geophysical data has been collected). For example, amplitude or attribute anomalies, and/or mapping horizons within a cap rock of a known reservoir, may be identified in initial seismic data—some or all of these may be DHI attributes. Further, anomalies may be characterized in the initial data. Optionally, a variety of displays (e.g., essential rock property analysis displays, DHI volume attribute displays, DHI attribute maps, cross-plots, fit-for-purpose seismic cross-sections, etc.) may be generated from the initial data. These displays and updates thereto may be referred to as "fundamental displays," which may be useful in aiding characterization of geophysical attributes of the data. Anomalies may be rated as to likelihood of being a valid DHI. Traditionally, this rating is done by one or more experts (e.g., geophysicists) interpreting and characterizing the data—such rating processes also fall within methods according to some embodiments of the present disclosure. In particular alternate embodiments described herein, however, DHI attributes may be identified and/or rated by automated or semi-automated methods, such as using an ML system. More details in identifying DHI and/or rating anomalies by ML system are described below in connection with FIG. 6. In some embodiments, preparing the data may also include entering, or causing to be entered, the otherwise-prepared data into the ML system.

By whatever means (e.g., human and/or automated, and whether or not utilizing fundamental displays) the DHI attributes may be characterized by quantification (for instance, rated in terms of a "DHI Scoring" scale). The anomaly may be rated in terms of anomaly confidence (e.g., level of confidence of the data used and calibration) and/or quality (e.g., quality of geophysical attributes). In these and various other embodiments, confidence level may be quantified based at least in part on aspects such as: seismic data density and quality, well or analogue calibration, and impedance signature fit-to-expectations. In these and various other embodiments, quality level may be quantified based at least in part on aspects such as: amplitude strength, AVO, anomaly strength, anomaly consistency, attribute down-dip termination, lateral amplitude or attribute contrast, fit-to-structure, and fluid contact reflection (e.g., a flat event).

Table 1 illustrates an example of prepared seismic data, in which DHI attributes of an anomaly have been rated using a scoring scale of 1-5 (5 being highest likelihood of a valid DHI). An exemplary set of geophysical attributes of confidence and quality is included in Table 1. It should be appreciated that prepared seismic data may take many forms; Table 1 is offered as an illustration showing the characterization of anomalies of seismic data by quantification. Additional or fewer attributes could be rated; a different scale could be used; and these ratings can be combined in various ways; and/or the scale could be used to quantify different characterizations (e.g., quality of data only, confidence in data only, or some other indicator that would tend to increase or decrease confidence in the likelihood that one or more anomalies do, in fact, indicate the presence of hydrocarbons in the subterranean formation of interest, and are thus valid DHI).

TABLE 1

| | DHI Attribute | Attribute Rating (DHI Scores) |
|---|---|---|
| Anomaly Confidence | Seismic Data Density | 5 |
| | Seismic Quality | 4 |
| | Well Calibration | 3 |
| | Impedance Fit | 3 |
| Anomaly Quality | Amplitude Strength | 3 |
| | AVO | 4 |
| | Lateral Contrast | 3 |
| | Amplitude Termination | 2 |
| | Fit to Structure | 3 |
| | Fluid Contact | 5 |

Traditionally, based on ratings, one or more experts would review the cumulative ratings and assign a single COV, quantifying (e.g., on a scale of 0 to 1, or the like) the COV—that is, the likelihood that the subterranean region of interest does, in fact, contain hydrocarbons. Table 2 illustrates an example of such an assignment based on the ratings of example Table 1, using a scale of 0.0 to 1.0 (with 1.0 indicating a 100% COV). Using traditional methods, this COV quantification would, for example, be based largely on a scoring matrix and experience of the expert or experts, with reference perhaps to some guiding criteria.

TABLE 2

| | DHI Attribute | Attribute Rating (DHI Score) | Chance of Validity (COV) |
|---|---|---|---|
| Anomaly Confidence | Seismic Data Density | 5 | 0.8 |
| | Seismic Quality | 4 | |
| | Well Calibration | 3 | |
| | Impedance Fit | 3 | |
| Anomaly Quality | Amplitude Strength | 3 | |
| | AVO | 4 | |
| | Lateral Contrast | 3 | |
| | Amplitude Termination | 2 | |
| | Fit to Structure | 3 | |
| | Fluid Contact | 5 | |

In various embodiments according to the present disclosure, on the other hand, a ML system is used to quantify COV based at least in part upon the prepared data. For instance, referring again to the example workflow 100 of FIG. 1, such workflow 100 continues at block 103 where the ML system is utilized to quantify COV, using the prepared data (e.g., rated attributes for a given set of seismic and/or other geophysical data collected from a subterranean formation of interest). In particular, some or all of the initial data, identified DHI attributes, essential displays, ratings, etc., may be prepared for use with the ML system. Further, utilizing the ML system may include entering, or causing to be entered, such prepared data into the ML system. A more detailed exemplary illustration of the portion of workflow 100 that is reflected in block 103 is provided in FIG. 2.

Figure 2:
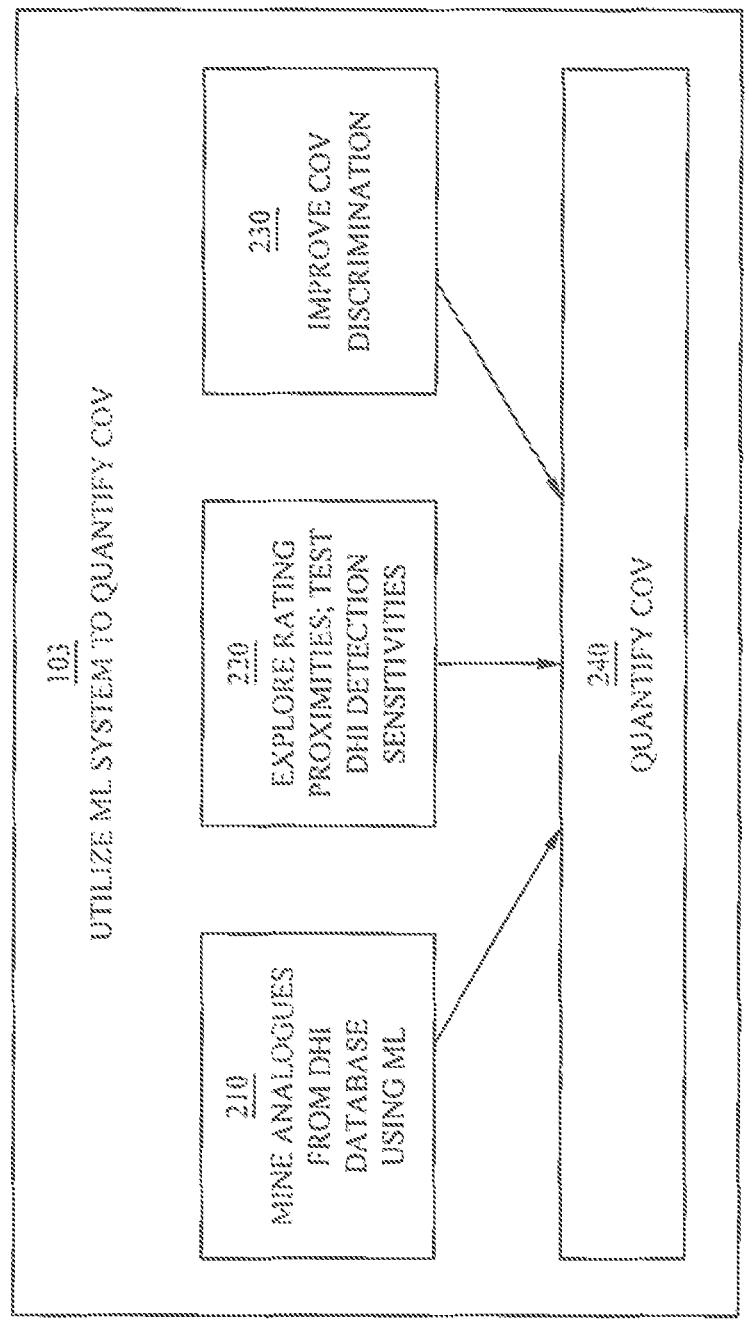
FIG. 2 is a more detailed exemplary illustration of a portion of the workflow in FIG. 1.

For instance, in some embodiments, a ML system (such as a SML system) may be utilized to improve COV discrimination (block 230 of FIG. 2). More particularly, the ML system may utilize a DHI database (for example, a COV ratings database (COV RDB, or "ratings database")) in assigning COV based at least in part upon the prepared data. Such a DHI database may incorporate a multi-attribute rating system and accompanying COV assignments. For example, a DHI database can be composed of two or more database entries each comprising previous attribute ratings (e.g., a database structure similar to Table 1, although it will be appreciated only a subset of the identified geophysical attributes, or all such attributes, or additional attributes, and/or different attributes may be included in various embodiments). In some embodiments, one or more (preferably a plurality, and more preferably each) of the database entries comprises the same geophysical attributes as are rated in the data preparation (block 102 of FIG. 1), although any one or more of such entries may comprise only a subset of the attributes (for instance, accounting for situations where past entries have incomplete or inaccurate attribute data, as even a subset of attribute data may still provide valuable insights). Preferably, the database contains more than two previous attribute ratings, such as 20 or more, 50 or more, 100 or more, 500 or more, or even 1,000 or more.

More generally, a database entry may comprise one or more of initial seismic or other geophysical data, identified DHI attributes, fundamental displays, and/or ratings thereof. Also, each database entry may further include a previously assigned COV (e.g., following the example structure of Table 2). A DHI database entry may further include additional data beyond DHI and their associated attribute ratings: for example, the entry may include general information (e.g., drilling well results) about previously explored subsurface regions. Taking the example of drilling well results, a database entry may include an outcome indicator setting forth a historical outcome of hydrocarbon prospecting or other hydrocarbon management decision associated with the subsurface to which the database entry's rated DHI attributes correspond (such subsurface with which a given database entry corresponds may, for convenience, be referred to as a previously prospected subsurface formation, and/or a previously analyzed subsurface formation). For example, if a database entry's DHI attribute rating corresponds to a previously analyzed subsurface formation (that is, if such anomaly were determined or otherwise derived based upon seismic or other data obtained from said subsurface formation) in which the subsurface was prospected and hydrocarbons were, indeed, found, the outcome indicator of that database entry would indicate presence of hydrocarbons. An outcome indicator could be as simple as a binary data structure (e.g., a "0" indicating hydrocarbons were not found in the formation; and a "1" indicating hydrocarbons were found in the formation). Furthermore, a DHI database may be catalogued for searching and selective retrieval of one or more entries—for example, based upon one or more DHI attributes present in the entry and/or one or more ratings present in the entry (e.g., retrieval of all entries with AVO rating of 4 or higher), and/or a combination of DHI attributes, and/or ratings (e.g., retrieval of all entries with AVO rating of 4 or higher and Fit to Structure 2 or lower).

In particular embodiments, the DHI database may be used to train the ML system, such that the ML system's utilization of the DHI database to assign COV to prepared data includes such training. Training may take place before providing prepared data to the ML system (e.g., such that the prepared data is provided to a trained ML system); and/or training may take place in response to data provided to the ML system (e.g., such that the training may be tailored to the particular prepared data of interest such as a special geological setting).

The ML system may be trained or retrained based on the initial data, identified DHI attributes, essential displays, and/or ratings thereof. In particular the ML system may be trained using some or all entries of the DHI database. For example, a SML system according to some embodiments may be trained or retrained with data from a DHI database using various SML algorithms, such as, but not limited to, Logistic Regression, Support Vector Machines, and/or Random Forest. As a result of the training, a predictive model may be established and/or validated, based upon the dataset used for training (e.g., the DHI database entries used for training). The ML/SML system may furthermore be retrained when new training data becomes available. For example, the predictive model may be updated when the inclusion of different variables and/or examples changes. As another example, the predictive model may be updated when new training data becomes available as more wells are drilled—e.g., by addition of one or more new entries to a DHI database, such entries including the DHI attribute ratings, assigned COV (by ML system and/or by expert), and outcome(s) of drilled wells.

Also or instead, in various embodiments, a subset of a DHI database may be utilized for training of, and/or reference by, a ML system. For example, a ML system, such as an SML system, may be utilized to mine analogues from a DHI database, as illustrated in block 210 of FIG. 2. In some embodiments, the data mining may be performed by using a number of filters (e.g., user-specified filters) on the input database. Also or instead, the data mining may be performed by leveraging properties of the machine-learning algorithm. For example, the proximity/similarity measurement provided by some implementations of Random Forest machine learning may be used for analogue data mining.

Figure 3A:
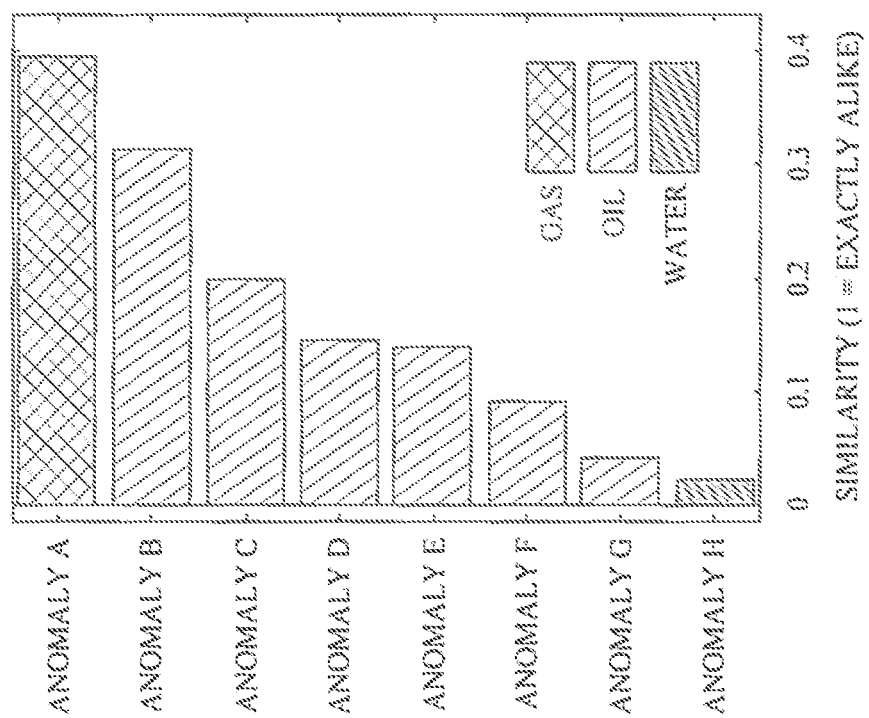
FIG. 3A illustrates exemplary proximity/similarity measurements from a Random Forest ML system.

An illustration of proximity/similarity measurements from a Random Forest ML system is provided in FIG. 3A. As illustrated, identified drilled analogues are listed in order of similarity (which may assist COV determination). The proximity/similarity value may be increased by one for each pair of anomalies that land at the same terminal node of a tree in the Random Forest. After the anomalies are sent through every tree, the proximity value may be normalized by the number of trees. A pairwise matrix may be created that lists the proximity value for each entry in the database with respect to each other entry. High proximity/similarity values may be considered to be suggestive of similarity between entries based on the attributes used in the training routine.

Figure 3B:
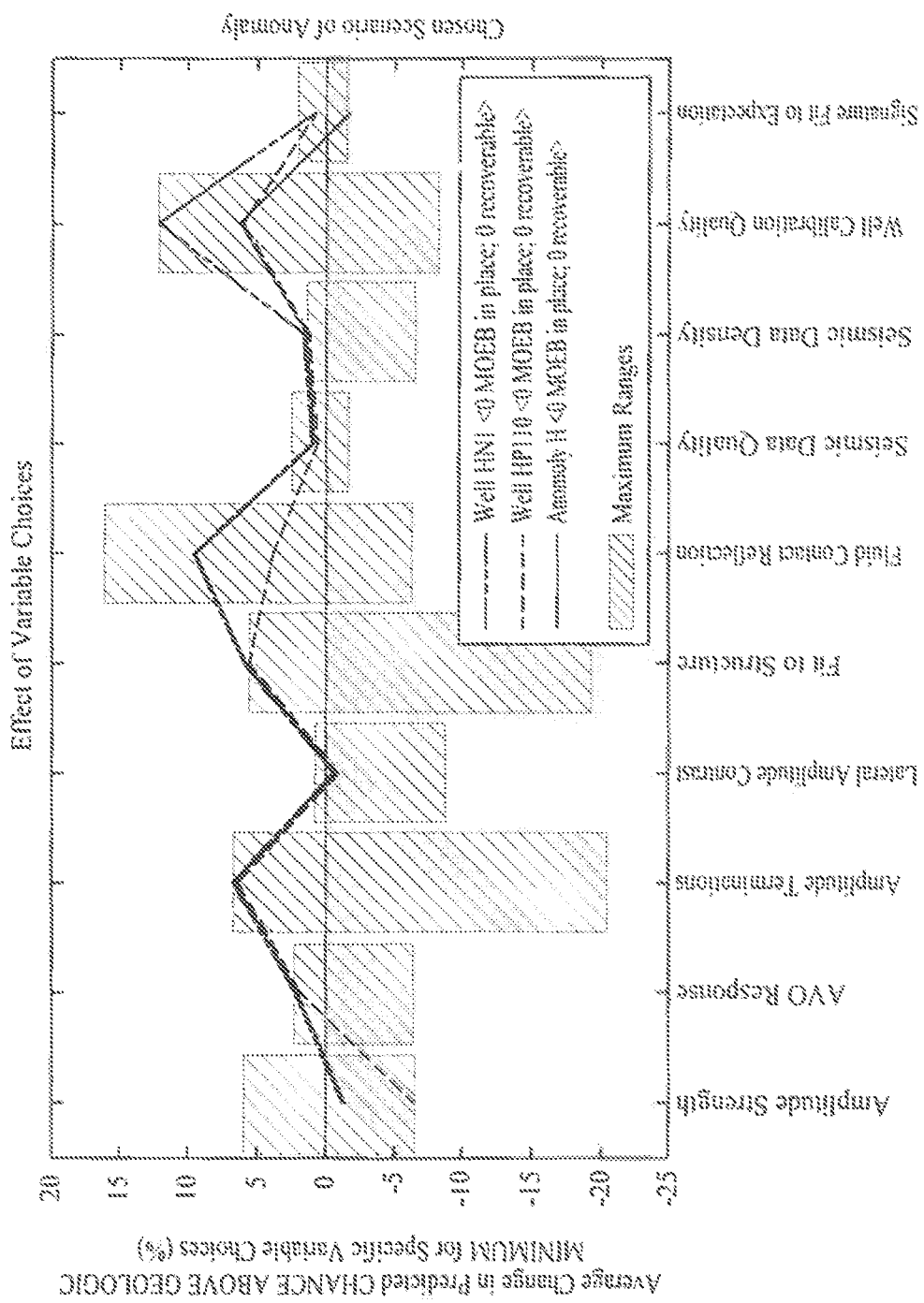
FIG. 3B illustrates an exemplary graph comparing an observed anomaly to selected drilled anomalies.

After an analogue or a set of analogues have been selected, ratings and/or other characteristics of DHI can be compared by a chart, such as that shown in FIG. 3B. As illustrated, in a test run, the system has identified two rated and drilled anomalies from the database (dashed lines) that are similar to a queried rated anomaly (solid line). The system has also identified the outcomes of each rated anomaly (each drilled anomaly or well has 0 MOEB in place; 0 recoverable). In FIG. 3B, each line indicates the ratings of the ten DHI attributes (x axis) assigned to each respective anomaly; the bars indicate ranges of ratings that the system identified as analogues.

Another example of analogue data mining includes the use of Independent Conditional Expectation (ICE) analysis. ICE plots for various entries may demonstrate how each entry behaves as a function of each feature/variable for every set of possible values. Entries that demonstrate similar behaviors with respect to the model could be considered as analogous (e.g., candidates for detailed examination).

As another example, the ML/SML system may be utilized to explore (e.g., with Monte Carlo simulation) rating proximities and/or to test DHI detection sensitivities, as illustrated in block 220. As another example, the ML/SML system may be utilized to improve, optimize, and/or maximize COV discrimination, as reflected in block 230. In some embodiments, a COV may be assigned based on any one of or any combination of two or more (including all) of these exemplary methods to quantify COV. In some embodiments, detected DHI may be rated in terms of anomaly confidence and/or quality. In some embodiments, anomaly confidence may be rated and/or evaluated in aspects such as: seismic data density and quality, well or analogue calibration, validated DHI attributes by drilling in the area, and impedance signature fit to expectations. In some embodiments, anomaly quality may be rated and/or evaluated in aspects such as: amplitude strength, AVO or AVA, anomaly strength, anomaly consistency, attribute down-dip termination, lateral amplitude/attribute contrast, fit-to-structure, and fluid contact reflection (e.g., a flat event). In some embodiments, based on ratings from these attributes (Table 1), the chance that the subsurface formation contains hydrocarbons may be quantified and/or represented using COV in percentage or fraction.

Figure 4:
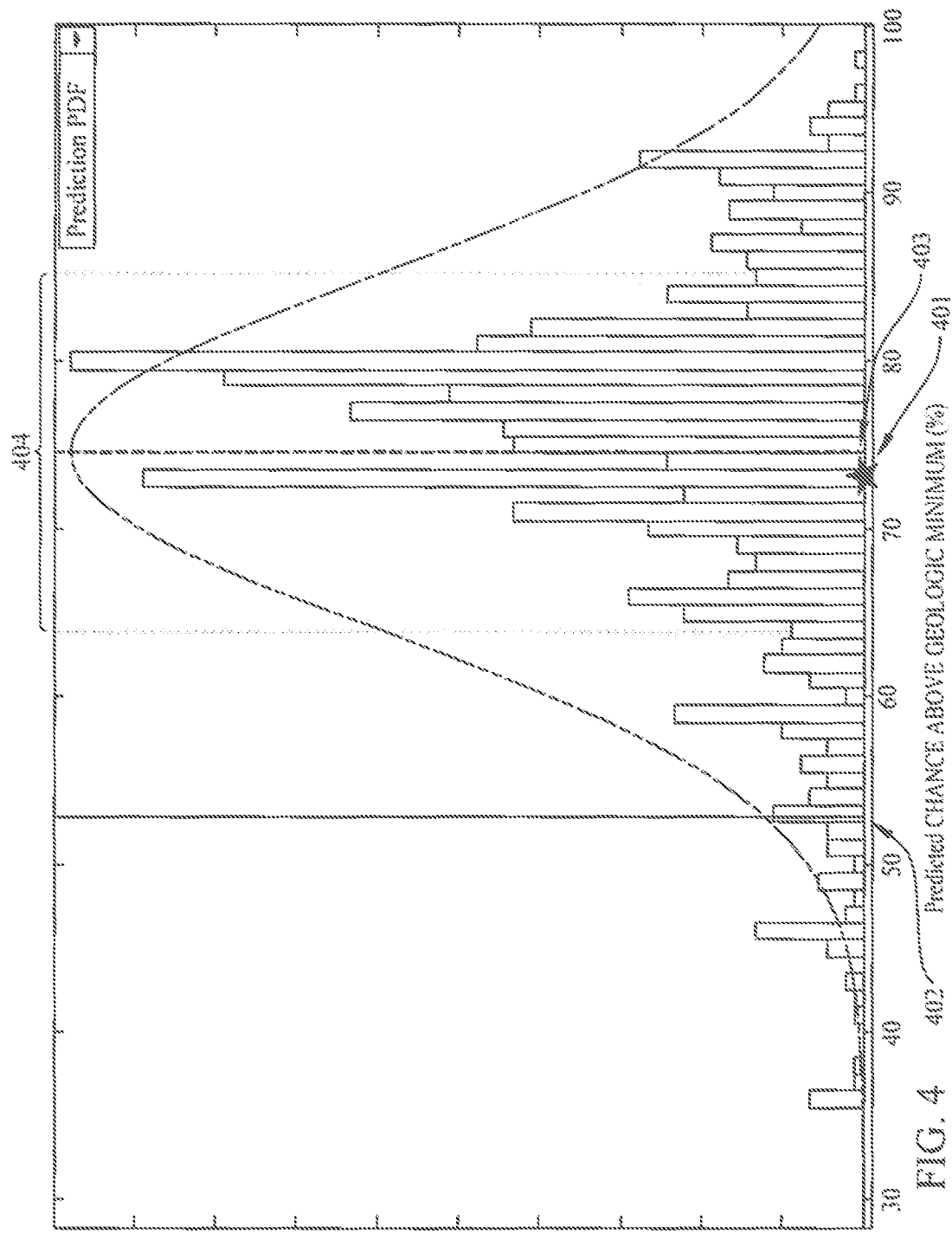
FIG. 4 illustrates exemplary rating sensitivity and simulated observation sensitivity to assist COV determination and uncertainty understanding and quantification.

An illustration of rating sensitivity and simulated observation sensitivity to assist COV determination and uncertainty understanding is shown in FIG. 4. FIG. 4 provides a distribution of COV predictions from a trained Random Forest classifier. From the distribution is identified the expert consensus COV (at 401), a base COV prediction for all entries (at 402), an average (at 403), and a standard deviation (at 404) associated with the COV prediction, given the sensitivity tests. In some embodiments, a ML system may be utilized to facilitate a user in assigning a COV. For example, a ML system may be utilized for mining analogues within a DHI database; the ML system can directly output a suggested COV, and/or the expert can review prior COVs resulting from database entries returned as analogues by the ML system. As another example, a ML system may be utilized for exploring similarity and/or observation sensitivity. As another example, ML may be utilized for direct COV quantification by accepting expert consensus prediction or average predictions. In some embodiments, the ML system is a SML system that includes Random Forest, Support Vector Machines, and/or Logistic Regression, and/or an ensemble model thereof.

Figure 5A:
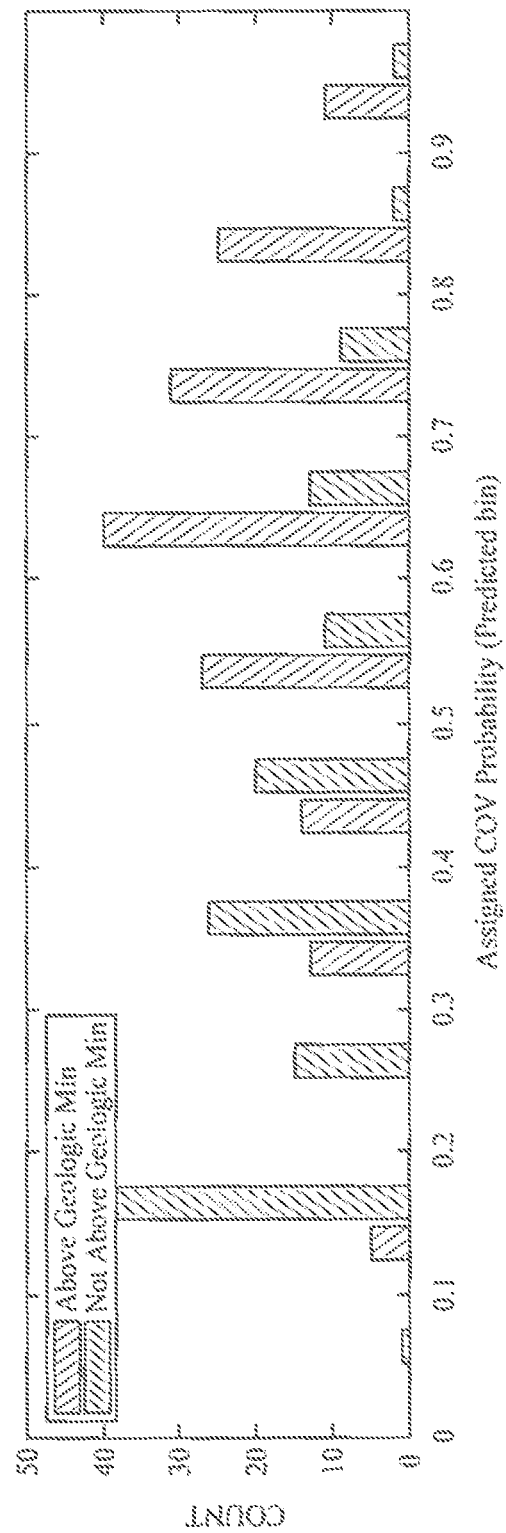
FIG. 5A and FIG. 5B illustrate a comparison of exemplary COV estimates from expert judgment versus exemplary COV estimates from a ML system.
Figure 5B:
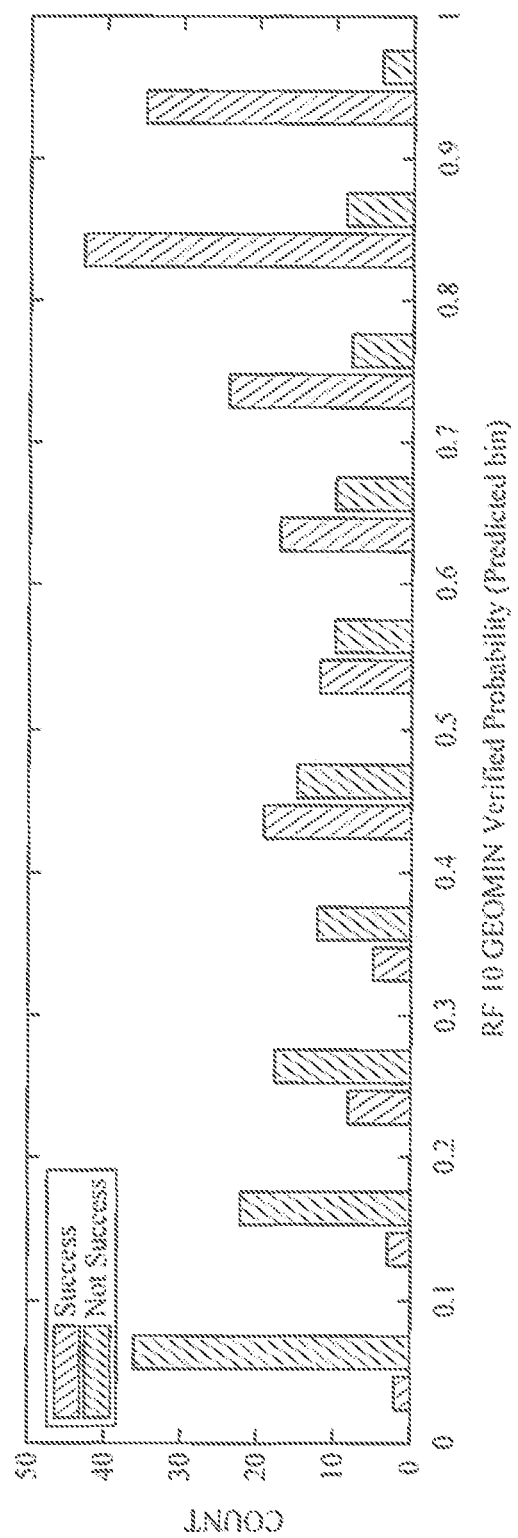

Utilizing a ML system for COV quantification may, in many cases, provide more valuable COV estimates than previously available (e.g., from expert analysis alone). FIG. 5A and FIG. 5B illustrate a comparison of COV estimates previously available from expert judgment versus COV estimates derived from a Random Forest classifier trained to predict the presence of hydrocarbon accumulations above economic thresholds. For example, as previously available, one or more experts may analyze a DHI in light of general experience and/or local knowledge to generate COV estimates. Often, the DHI attribute rating and COV estimates are peer reviewed by a group of experts. Manual interpretation typically utilizes mental integration of large and/or diverse sources of data. Often, the manual interpretation can be very time-consuming Being human-driven, results from manual interpretation tend to vary with the unique personality and memory of those who produced the results. As illustrated in FIG. 5A, experts have historically decided on COV estimates without strong discrimination. For example, there are almost no estimates of chance of failure <10% or greater than 80%. Likewise, the ratings of geologic chance of success resemble a broad bell-curve centered on 65%. However, as illustrated in FIG. 5B, ML systems tend to make COV estimates with strong discrimination. The illustrated example included independent predictions of a Random Forest COV for every entry in the database. The entry to be predicted was held out of the database for training, but the rest of the entries were used for training at each iteration. The independently predicted Random Forest COVs were plotted as a replacement for historical COV determinations to compare with FIG. 5A. An increase in discrimination is notable when using the Random Forest method over historical human determinations. For example, the chance of failure peaks at <10% and drops from there to 35%. Likewise, the geologic chance of success peaks at 85%, having a large number at 95%, and rising from 65% to 85%. In some embodiments, results may be obtained more quickly and may be more accurate than with manual interpretation. Success and failure are indicated by historical drilling well outcomes of hydrocarbon exploration carried out in connection with the determined COV; that is, a high COV associated with a hydrocarbon discovery is considered a success for the prediction, while a high COV associated with a failure to find hydrocarbons is considered a failure, and so on.

The workflow 100 continues at block 104 where, based on the quantified COV, hydrocarbon management decisions are made. Notably, since the quantified COV may result in a better constrained geological chance of success, the hydrocarbon management decisions may be made with better inputs, resulting in better decisions. For example, a decision may be made to drill one or more new wells at a particular site. In some embodiments, the workflow 100 concludes at block 106 after block 104.

In some embodiments, the workflow 100 continues at block 105 where new data is obtained based on the hydrocarbon management decisions. For example, if the hydrocarbon management decision included drilling at a new well site, new data may be collected at the new well site. In some embodiments, the new data is used to update the ML system (e.g., it may be added to the DHI database as a new entry, including well drilling outcome, as noted previously), and the workflow 100 returns to block 102. In other embodiments, the workflow 100 concludes at block 106 after block 105.

Identifying DHI and/or Rating DHI Attributes Using Machine Learning

As noted above in connection with the description of using ML systems to quantify COV, DHI may be detected/identified and/or DHI attributes may be rated by experts utilizing seismic and/or other geophysical data and/or their derivatives. In alternative embodiments of the present disclosure, however, DHI detection/identification and/or characterization by quantification (e.g., attribute rating) is carried out using a ML system.

Figure 6:
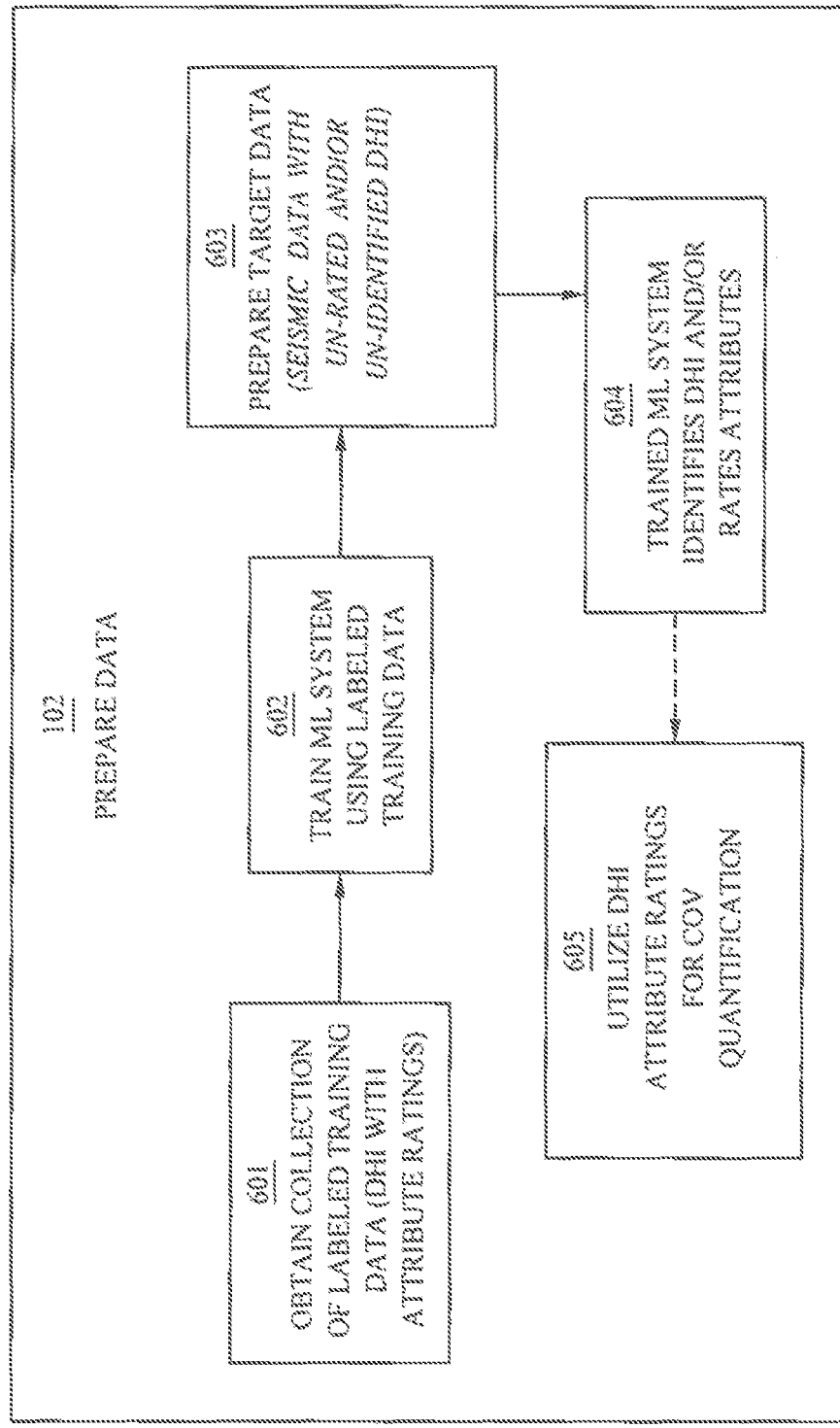
FIG. 6 illustrates an exemplary workflow that utilizes a ML system to detect DHI and/or to rate attributes in seismic or other geophysical data.

According to some embodiments, this may be done as part of the workflow 100—e.g., as shown in FIG. 6, which illustrates a workflow in which using a ML system for DHI identification and/or attribute rating is carried out as part of preparing data per block 102 of FIG. 1.

For instance, such processes may include obtaining a collection of labeled training data (e.g., seismic or other geophysical data and/or their derivatives associated with DHI identification and/or rated DHI attributes), per block 601. These processes may further include training the ML system (e.g., using labeled training data, per block 602 of FIG. 6), preparing target data (seismic or other geophysical data and/or their derivatives with un-rated DHI attributes and/or un-identified anomaly, per block 603 of FIG. 6), and using the trained ML system to identify DHI from the seismic data, and/or to rate DHI attributes from the seismic data (FIG. 6, block 604). The DHI and/or ratings output by the ML system (that is, the prepared data) are then in turn utilized for COV quantification at block 605 (which may include, e.g., entering, or causing to be entered, such prepared data into the ML system for COV quantification). The ML system for COV quantification may be the same as the ML system for DHI identification and/or DHI attributes rating, or the ML system may be a different ML system (e.g., methods may involve using a first ML system for DHI identification and/or DHI attribute rating; and a second ML system different from the first for COV quantification).

However, it should also be recognized that, according to various other embodiments, DHI identification and/or characterization by quantification may be carried out independently of ML COV quantification (that is, DHI identification and/or characterization it) need not be part of the workflow 100). For instance, some embodiments may utilize a workflow similar to the workflow of blocks 601, 602, 603, and 604 of FIG. 6, but omit block 605 (utilizing DHI attribute ratings for COV quantification), for example based on the prepared data comprising the ML-output DHI identification and/or DHI attribute ratings. Instead, such various other embodiments may include use of an ML system to identify DHI and/or rate attributes, followed by one or more experts thereafter quantifying COV using the ML system-generated DHI identification and/or DHI attribute rating. Or, a combination of expert COV rating and ML system COV quantification could be used.

Referring back to FIG. 6, as noted, the exemplary workflow includes at block 601 obtaining a collection of labeled training data (e.g., geophysical data (for example, seismic data) and/or derivatives thereof with labels identifying the DHI with ratings that should be derived from such data; or geophysical data (e.g., seismic data) and/or derivatives thereof with labels identifying what DHI are present in said data). "Labeling," as is known in the art of machine learning, generally refers to providing the desired result(s) that should be output from the ML system given input data (or a set of input data). The labeled training data may include, at least, a plurality of entries of a DHI database (e.g., each entry may include, at least, one or more attribute and/or anomaly ratings and an outcome indicator). The workflow continues at block 602 with training the ML system using the labeled training data. For example, the ML system may be trained using the collection of labeled training data. In some embodiments, training the ML system establishes a predictive model in the ML system derived at least in part from outcome indicators of each DHI database entry in the collection of labeled training data. The ML system according to such embodiments may be trained in the same manner as described above with respect to training ML systems in connection with quantifying COV, except that the desired prediction is of the identification of DHI from input seismic or other geophysical data; and/or the ratings of DHI attributes of the input seismic or other geophysical data. For instance, the ML system may be trained or retrained using various supervised machine-learning algorithms, such as, but not limited to, Logistic Regression, Support Vector Machines, Random Forest, and/or Naïve Bayes. The predictive model derived from such training outputs identification of DHI and/or ratings of DHI attributes for a given input seismic or other geophysical data set.

The training data for such an ML system may advantageously also come from a DHI database—however, it will be appreciated that rather than training to predict an outcome (e.g., quantify COV), such a system would instead be trained to match as closely as possible the known identified DHI and/or DHI attribute ratings for each entry in the DHI database. Preferably, then, each such entry of the DHI database according to such embodiments will also have associated therewith the seismic or other geophysical data and their derivatives from which the DHI identifications and/or attribute ratings were identified. The model would then accordingly be trained to identify, for given input training seismic data, the corresponding DHI identified in the training data and/or the attribute ratings previously assigned to such input training seismic data.

Thus, the trained model would function to predict—given new (in the sense of being distinct from data used for training) the seismic or other geophysical data, and/or derivatives thereof (see FIG. 6, block 603)—DHI that should be identified in such data; and/or to accurately predict, given the seismic or other geophysical data, attribute ratings for such data (see FIG. 6, block 604).

It will be appreciated that some embodiments of such a ML system may be trained based upon only a subset of DHI database entries, and/or an ML system, when employed to analyze new input geophysical data, may identify analogues from among its training data (e.g., using proximity/similarity measurements from a Random Forest algorithm and/or based on specified filters). Such subsets of training data (whether for training or identification of analogues) may be selected using any of the analogue reference strategies described above with respect to COV quantification using ML systems. This may be particularly useful for mining labeled analogues of a given set of seismic or other geophysical data, so that the ML system will, once trained on such labeled analogues, more accurately predict the DHI that should be identified from a given set of seismic or other geophysical data; and/or more accurately predict the attribute ratings that should result from such seismic or other geophysical data and derivatives. For instance, analogues may be determined based upon the type of formation of interest, the region of the world from which the seismic or other geophysical data of interest is gathered, or the like (which may be determined from filters, either user-entered, or machine-suggested/identified). Or, analogues may be determined by proximity/similarity measurements, ICE analysis, and/or other data-driven analogue identification in accordance with the previous discussion.

Furthermore, as with methods using a ML system for COV quantification, methods that employ a ML system for DHI identification and/or attribute rating may further include expert review of the system-identified DHI and/or system-rated DHI attributes, with an aim toward providing further labels on the system-reviewed seismic or other geophysical data. Such labels may enable further training of the ML system, e.g., through the same means as training based on labeled training data (e.g., DHI database entries).

In practical applications, the present technological advancement may be used in conjunction with a seismic data analysis system (e.g., a high-speed computer) programmed in accordance with the disclosures herein—and in particular, a ML system may be an example of a seismic data analysis system. In some embodiments, the seismic data analysis system is a high performance computer ("HPC"), as known to those skilled in the art. Such high performance computers typically involve clusters of nodes, each node having multiple CPUs and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM.

Figure 7:
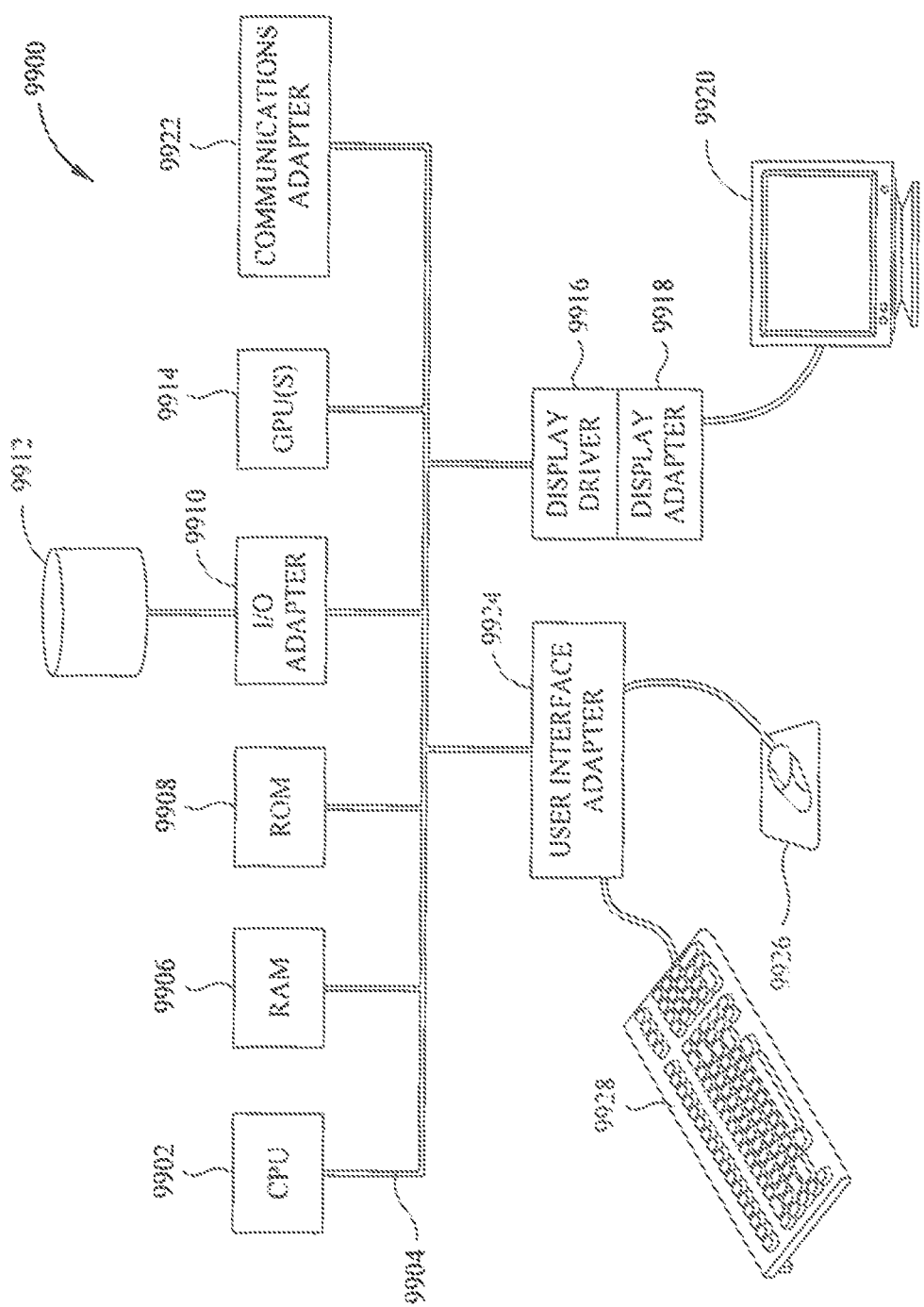
FIG. 7 illustrates a block diagram of an exemplary seismic data analysis system upon which the present technological advancement may be embodied.

FIG. 7 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 7, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory ("RAM") 9906, which may be SRAM, DRAM, SDRAM, or the like. The system 9900 may also include additional non-transitory, computer-readable media such as a read-only memory ("ROM") 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; it may potentially also include one or more graphics processor units (GPUs) 9914, and one or more display driver(s) 9916.

The I/O adapter 9910 may connect additional non-transitory, computer-readable media such as a storage device(s) 9912, including, for example, a hard drive, a compact disc ("CD") drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models discussed herein. As the models themselves are representations of geophysical data, such a display device may also be said more generically to be configured to display graphical representations of a geophysical data set, which geophysical data set may include the models described herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application-specific integrated circuits ("ASICs") or very large-scale integrated ("VLSI") circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

Seismic data analysis system 9900 may include one or more machine-learning architectures, such as Logistic Regression, Support Vector Machines, Random Forest and/or Naïve Bayes. The machine-learning architectures may be trained on various training data sets. The machine-learning architectures may be applied to analysis and/or problem solving related to various unanalyzed data sets. It should be appreciated that the machine-learning architectures perform training and/or analysis that exceed human capabilities and mental processes. The machine-learning architectures, in many instances, function outside of any preprogrammed routines (e.g., varying functioning dependent upon dynamic factors, such as data input time, data processing time, data set input or processing order, and/or a random number seed). Thus, the training and/or analysis performed by machine-learning architectures is not performed by predefined computer algorithms and extends well beyond mental processes and abstract ideas.

The above-described techniques, and/or systems implementing such techniques, can further include hydrocarbon management based at least in part upon the above techniques. For instance, methods according to various embodiments may include managing hydrocarbons based at least in part upon DHI analysis results outputted according to the above-described methods, and/or based upon analytical outputs. For example, some methods may include utilizing a trained ML system to perform DHI analysis. That DHI analysis results may be used directly in managing hydrocarbons, and/or it may be used indirectly (e.g., to inform, including by modifying, an expert's DHI analysis). The results of DHI analysis informs a COV, which in turn is used in managing hydrocarbons. In particular, such methods may include drilling a well, and/or causing a well to be drilled, based at least in part upon the DHI analysis (e.g., based at least in part upon the COV determined from the DHI analysis) of various embodiments (e.g., such that the well is located based at least in part upon a location determined from the DHI analysis, such as based at least in part upon a location determined from the COV determined from the DHI analysis). Methods may further include prospecting for and/or producing hydrocarbons using the well.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The invention claimed is:

1. A method of managing hydrocarbons in a prospective subsurface formation, said method comprising:
(a) obtaining geophysical data from the prospective subsurface formation;
(b) utilizing a trained machine learning (ML) system to identify one or more direct hydrocarbon indicators (DHI) of the geophysical data,
wherein the trained ML system has been trained utilizing a collection of labeled training data so as to establish in the trained ML system a predictive model for identifying DHI of input geophysical data, said labeled training data comprising (1) initial geophysical data and/or derivatives thereof, and (2) labels identifying DHI of said initial geophysical data and/or derivatives thereof; and further
wherein the identification of the one or more DHI is generated from operation of the predictive model on the geophysical data; and further
wherein the labeled training data is obtained from a DHI database, said DHI database comprising two or more entries, each entry corresponding to initial geophysical data obtained from a previously analyzed subsurface formation or from a synthetically generated dataset representing a subsurface formation; and further wherein each entry comprises (i) identification of DHI of the initial geophysical data; and
(c) managing hydrocarbons in the prospective subsurface formation based at least in part upon the one or more DHI identified.

2. The method of claim 1, wherein:
the labeled training data further comprises (3) labels identifying DHI attribute ratings associated with said DHI of the initial geophysical data and/or derivatives thereof;
the method further comprises (b-1) using the trained ML system to assign DHI attribute ratings for the respective DHI of the geophysical data; and
the (c) managing hydrocarbons is additionally based at least in part upon the ratings assigned to the respective DHI.

3. The method of claim 2, further comprising (b-2) quantifying a chance of validity (COV) based at least in part upon the assigned DHI attribute ratings for the respective DHI of the geophysical data; and further wherein the (c) managing hydrocarbons is additionally based at least in part upon the quantified COV.

4. The method of claim 1, wherein the initial geophysical data comprises one or more of: seismic data acquired from one or more previously prospected subsurface formations, and synthetic seismic data; and further wherein the geophysical data obtained from the prospective subsurface formation comprises seismic data.

5. The method of claim 1, wherein the trained ML system comprises a trained Supervised Machine Learning (SML) system, and further wherein the trained SML system is trained using one or more of the following algorithms: Random Forest, Logistic Regression, and Support Vector Machines.

6. The method of claim 1, wherein each entry further comprises (ii) DHI attribute ratings associated with the identified DHI.

7. The method of claim 1, wherein (c) obtaining, from the ML system, identification of one or more DHI present in the prospective subsurface formation comprises:
mining, from the DHI database, analogues to the obtained geophysical data from the prospective subsurface formation; and
using the mined analogues as the collection of labeled training data.

8. The method of claim 1, wherein managing hydrocarbons in the prospective subsurface formation comprises one or more of: causing a well to be drilled in the prospective subsurface formation; prospecting for hydrocarbons in the prospective subsurface formation; and producing hydrocarbons from the prospective subsurface formation.

9. A method comprising:
(a) obtaining new geophysical data and/or derivatives thereof from a prospective subsurface formation;
(b) training a machine learning (ML) system using a collection of labeled training data comprising either or both of: (b-1) initial geophysical data and/or derivatives thereof with labels identifying direct hydrocarbon indicators (DHI) of said data; or (b-2) initial geophysical data and/or derivatives thereof with labels identifying attribute ratings of DHI of said data, wherein the collection of labeled training data is obtained from a DHI database, said DHI database comprising two or more entries, each entry corresponding to initial geophysical data obtained from a previously analyzed subsurface formation or from a synthetically generated dataset representing a subsurface formation; and further wherein each entry comprises (i) identification of DHI of the initial geophysical data and (ii) DHI attribute ratings associated with the identified DHI;

(c) inputting the new geophysical data and/or derivatives thereof into the trained ML system;

(d) obtaining from the trained ML system one or both of: (d-1) a predicted identification of DHI or (c-2) a predicted DHI attribute rating based on the new geophysical data and/or derivatives thereof; and (e) making a hydrocarbon management decision with respect to the prospective subsurface formation based at least in part upon the predicted identification of DHI and/or the predicted rating of anomalies.

10. The method of claim 9, wherein the initial geophysical data comprises one or more of: acquired seismic data, synthetic seismic data, and data from a library of seismic data.

11. The method of claim 9, wherein training the ML system comprises establishing therein a predictive model for identifying DHI and/or rating DHI of input geophysical data, through operation of the predictive model on the input geophysical data.

12. The method of claim 9, wherein the trained ML system comprises a Supervised Machine Learning (SML) system, and further wherein the trained SML system is trained using one or more of the following algorithms: Random Forest, Logistic Regression, Support Vector Machines, and Nave Bayes.

13. The method of claim 9, wherein (b) training the ML system comprises: mining the collection of labeled training data to identify analogues to the new geophysical data and/or derivatives thereof, and using only the identified analogues in training the ML system.

14. The method of claim 13, wherein analogues are identified based on specified filters applied to the collection of labeled training data.

15. The method of claim 13, wherein analogues are identified using proximity/similarity measurements from a Random Forest algorithm.

16. The method of any one of claim 9, wherein making a hydrocarbon management decision with respect to the prospective subsurface formation comprises one or more of: causing a well to be drilled in the prospective subsurface formation; prospecting for hydrocarbons in the prospective subsurface formation; and producing hydrocarbons from the prospective subsurface formation.

* * * * *